United States Patent [19]
Harp

[11] 3,754,657
[45] Aug. 28, 1973

[54] FILTER PRESSES
[76] Inventor: John Harp, Woodlands Grange, 25 Caverswall Rd., Stoke-on-Trent, England
[22] Filed: Feb. 23, 1972
[21] Appl. No.: 228,699

Related U.S. Application Data
[63] Continuation-in-part of Ser. No. 1,712, Jan. 9, 1970, abandoned.

[30] Foreign Application Priority Data
Jan. 16, 1969   Great Britain ..................... 2,533/69
Aug. 27, 1969   Great Britain ................. 42,633/69
Feb. 26, 1971   Great Britain ..................... 5,506/71

[52] U.S. Cl. ............................................. 210/230
[51] Int. Cl. ........................................... B01d 25/00
[58] Field of Search ..................... 210/224, 230, 236

[56]        References Cited
            UNITED STATES PATENTS
3,207,315   9/1965   Kunta ............................ 210/236 X
3,232,435   2/1966   Lismer ........................... 210/236 X
3,251,472   5/1966   Kunta ............................ 210/236 X
3,306,455   2/1967   Lismer ........................... 210/236 X Primary Examiner—Frank A. Spear, Jr.
Assistant Examiner—T. A. Granger
Attorney—Alan H. Levine

[57]            ABSTRACT

There is described a propulsion mechanism for moving trays along a filter press, the mechanism consisting of one or more bars which may be arranged at the side or sides of or above the press and which are mounted for reciprocation lengthwise of the press. The bars may be reciprocated by a mechanical linkage or a fluid actuator and carry tray-engaging elements such that reciprocation of the bar or bars effects sliding movement of one or more trays along the press. The tray engaging elements may be spring-loaded to urge them into tray-engaging positions.

9 Claims, 9 Drawing Figures

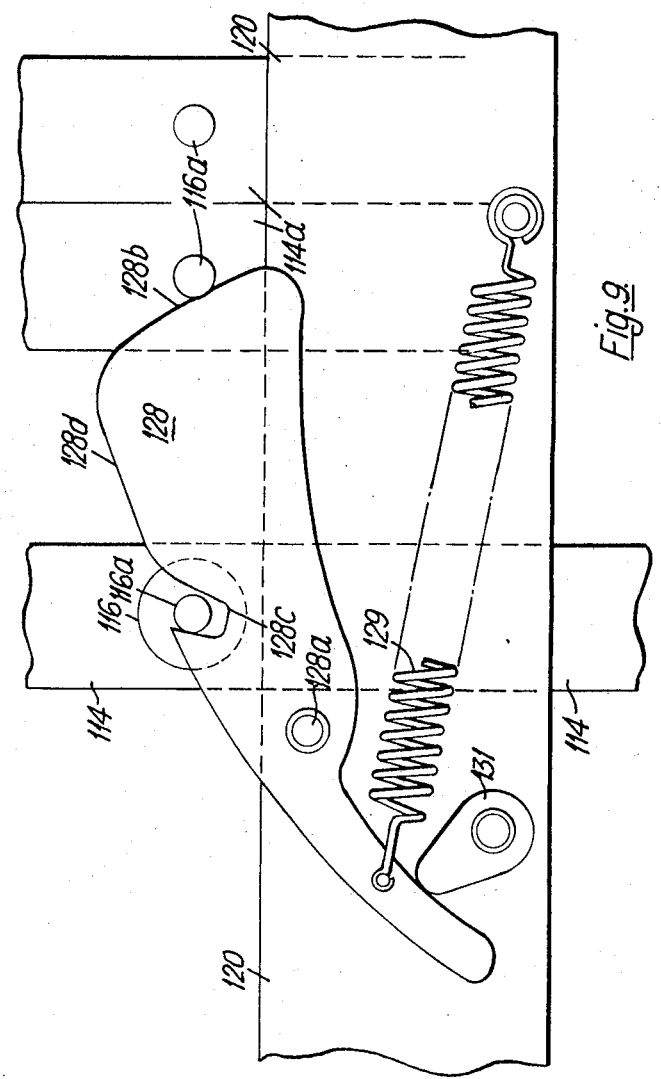

FILTER PRESSES

This application is a continuation-in-part of co-pending application Ser. No. 1712 filed Jan. 9, 1970 now abandoned.

This invention relates to filter presses and more especially to propulsion mechanism by which the trays are moved along the press.

It is necessary to move the trays, for instance in order to open them out at the end of a filter pressing cycle to let the filter cakes drop, and usually some form of catches or hooks engaging with the trays are made to travel to and fro along the press by means of suitable operating gear, thereby collecting each tray in turn and moving it along the press girders or runway as required.

This invention is concerned with improvements in the operating gear by which the movements of the catches or hooks are effected.

Various forms of automatic tray-moving mechanisms have been proposed hitherto. In one type the tray-moving mechanisms are arranged to move backwards and forwards the exact distance required at each operation, so that if there is a group or pack of trays with filter cakes between them, as would be the case at the conclusion of a filter-pressing cycle, the tray-moving mechanisms move back along the press far enough to engage with the first tray of the pack waiting to be moved, but do not over-travel and engage with the second tray of the pack, because if this were to happen the two trays would move together, and the formed filter cake between them could not drop out. Very small inaccuracies of travel can affect the operation adversely, and the operation is liable to be affected if extraneous matter or dirt builds up between the adjacent frames of the trays, so in effect increasing their thickness. In large presses there may be a large number of trays, with a corresponding increase in the number of tray-engaging mechanisms, each one of which acts to move a limited number of trays, each mechanism coming into operation in its turn as the sequence of operation proceeds; thus it will be appreciated that towards the end of the cycle of operations, the slight increases in the effective thickness of the trays has a cumulative effect, and the tray-moving mechanisms no longr move the precise distance necessary to collect one tray at each backward movement. Moreover in this type of mechanism it is necessary to incorporate some form of fine control for the length of the movements, such as limit switches which operate to stop the mechanism at each limit of its travel, and such arrangements both complicate the apparatus and increase the cost. In another type of arrangement an endless chain is used carrying abutments designed to engage with the trays, and for this purpose some form of selection devices are required on the trays themselves, so that each individual tray has to be constructed with these additional fitments to co-operate with the chain abutments; this again greatly increases the cost of the apparatus. Yet another prior proposal comprises a pair of screw-threaded shafts each extending the whole length of the press, which are subjected to rotation in order to cause reciprocating members, having means thereon engaging with the filter trays, to move to and fro along the shafts, according to the direction of rotation of the shafts, which are driven by a reversible electric motor which is reversed by the action of limit switches; this likewise is an extremely costly arrangement.

The object of this invention is therefore to provide a more simple and robust form of tray-moving mechanism which will not be affected in its operation by small variations in the effective thickness of the trays due to the accumulation of extraneous matter between trays, even in presses having a large number of trays.

This invention comprises a filter press having end frames, girder means extending horizontally along the press between the end frames, a plurality of filter press trays, rollers associated with each tray, the rollers running on the girder means to carry the trays on the girder means in a movable manner, bar means extending horizontally along the press, powered apparatus for subjecting the bar means to reciprocatory movements, a plurality of catch members mounted in a pivotal manner at intervals along the bar means, abutments associated with the trays, said catch members being adapted normally to lift pivotally into abutment-engaging positions but being capable of being deflected downwardly clear of said abutments and of moving thereunder, said catches being set at a predetermined spacing which is less than the length of the stroke of the reciprocatory movements of the bar means, said reciprocatory movements serving first to carry the catch members in the direction of a pack of filter trays awaiting movement and on reversal of the reciprocatory movement to bring back the catch members whereby one of them on moving from under the abutments lifts and engages with the abutments of the first tray of the pack and in the continuing reverse reciprocatory movement moves it away from the pack.

The invention further consists in a filter press having end frames, girder means extending horizontally along the press between the end frames, a plurality of filter press trays, each tray having rollers running on the girder means, bar means extending horizontally along the press parallel with the girder means, powered operating means for subjecting the bar means to lengthwise reciprocatory movements, a plurality of pivots fixed to the bar means at spaced intervals therealong, a plurality of catch devices each mounted upon one of the pivots, a plurality of springs one connected to each catch device and to the bar means, said springs tending to lift said catch devices, abutments associated with each tray, said catch devices having recesses therein capable of engaging with the abutments when the catch devices are lifted by the spring action, said reciprocatory movements of the bar means serving first to move the catch members towards a pack of filter trays awaiting movement, whereby said catch members are deflected downwardly against the spring action, and on reversal of the reciprocatory movement to bring back the catch devices so that one of them, emerging from under the abutments on the pack of trays, is raised by its spring action and made to lift operatively by its recess into engagement with the first tray of the pack and move said first tray away from the pack.

The reciprocatory movements of the bar means may be effected mechanically, for instance by a lever and linkage arrangement, or by fluid-pressure means, which latter may be either pneumatically or hydraulically operated.

Constructional forms of the invention will now be described by way of example with reference to the accompanying drawings in which:

FIG. 9 is a side view of a further alternative.

Figure 1:
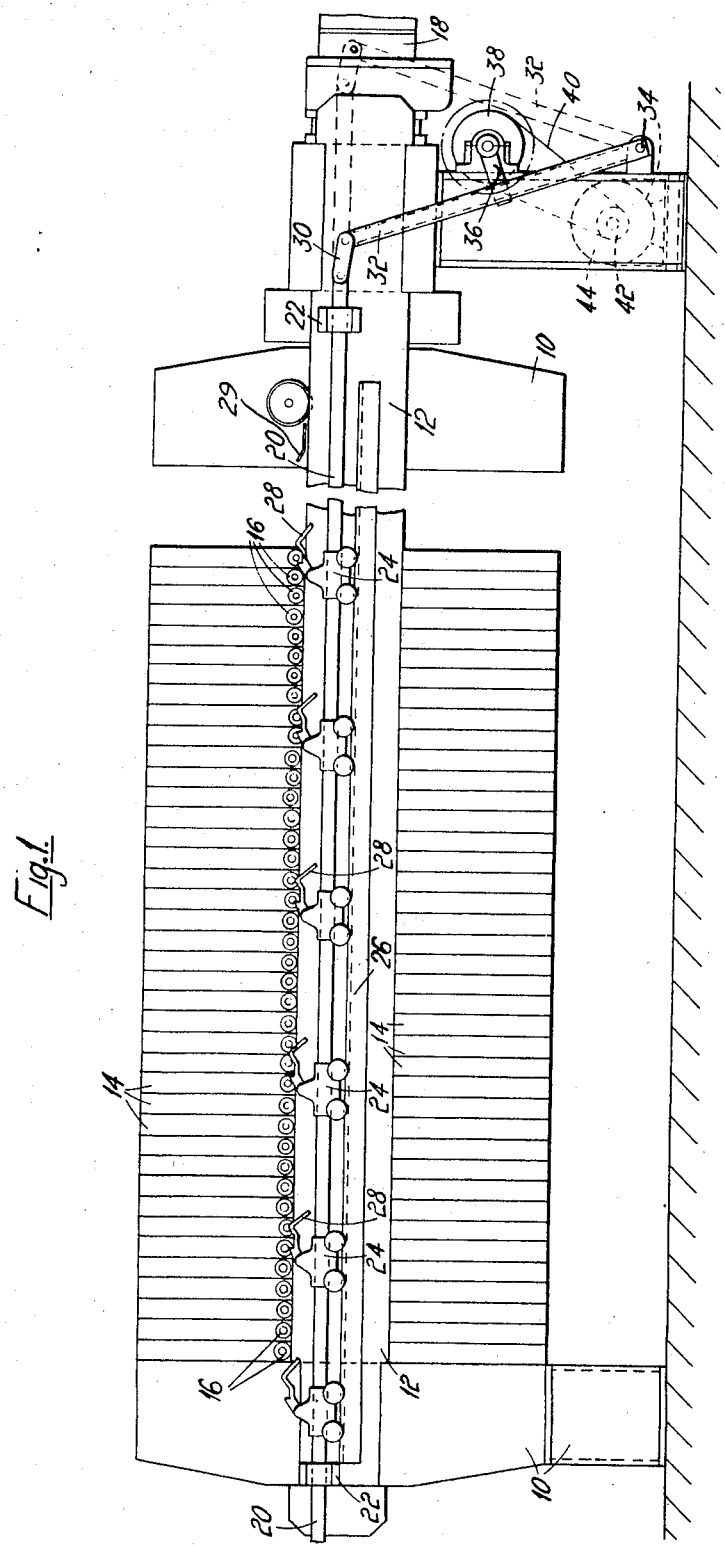
FIG. 1 is a side elevation of a filter press.

Referring to FIG. 1 the press as a whole may be of conventional design comprising end frames 10 and side girders 12 on which the filter press trays 14 are supported on rollers 16. Closing gear for operating the press trays in the pressing operation is indicated at 18.

Two horizontal bars are provided, one at each side of the press, one being seen at 20, slidably mounted in guides 22 attached to the girders 12. To these bars a series of carriages 24 are attached, running on a track 26 at each side of the press, the tracks being also carried by the respective girders. Each carriage 24 carries a catch 28 shaped to engage under the pins of the tray rollers 16 so that as illustrated the leading carriage 24 is engaging with the leading tray 14 and is capable of moving it to the right as viewed in FIG. 1. The catches 28 on the other carriages shown are restrained from engaging pins by the presence of trays to their right. The catches are set at a pre-determined spacing and the number is determined by the length of the press. The spacing is governed by the length of stroke of the reciprocating movement, and must in all cases be less than this length of stroke. The reciprocating movement of the bars 20, from which the successive rightward movement of each tray is effected, is achieved as shown in FIG. 1 by a link 30 connected to a lever 32 working on a pivot 34, the alternative position of the lever being indicated in dotted lines. The lever is actuated by a link 36 from a driving pulley or sprocket 38 operated by a V-belt or chain 40 from another pulley or sprocket 42 driven by a motor 44. It will be evident that by this arrangement the exact amount of the reciprocation does not have to be limited precisely since the catches engage under the pins of the rollers as they move back, and the operative catch engages only with the first tray of the pack as the return reciprocatory movement takes place. Thus a build-up of extraneous material between the abutting faces of the tray frames will not affect the proper operation of the mechanism.

Figure 2:
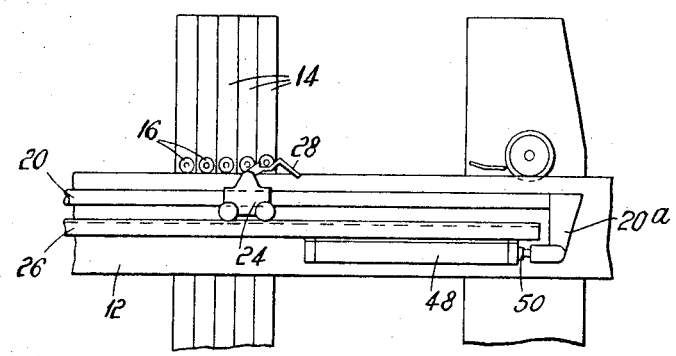
FIG. 2 is a part side elevation of a filter press showing an alternative arrangement.

FIG. 2 shows an alternative arrangement in which the reciprocation of the bars is effected by a fluid pressure cylinder 48 and piston 50 operatively connected to a bracket 20$^a$ on the bar 20.

Figure 3:
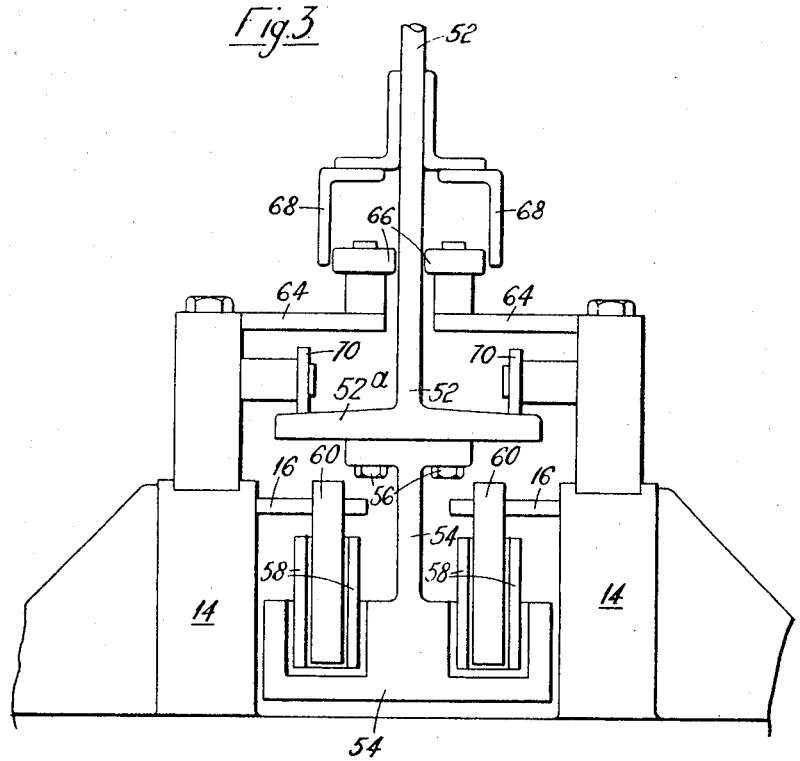
FIGS. 3 and 4 are, respectively, a part end view and part side view showing a further alternative arrangement.
Figure 4:
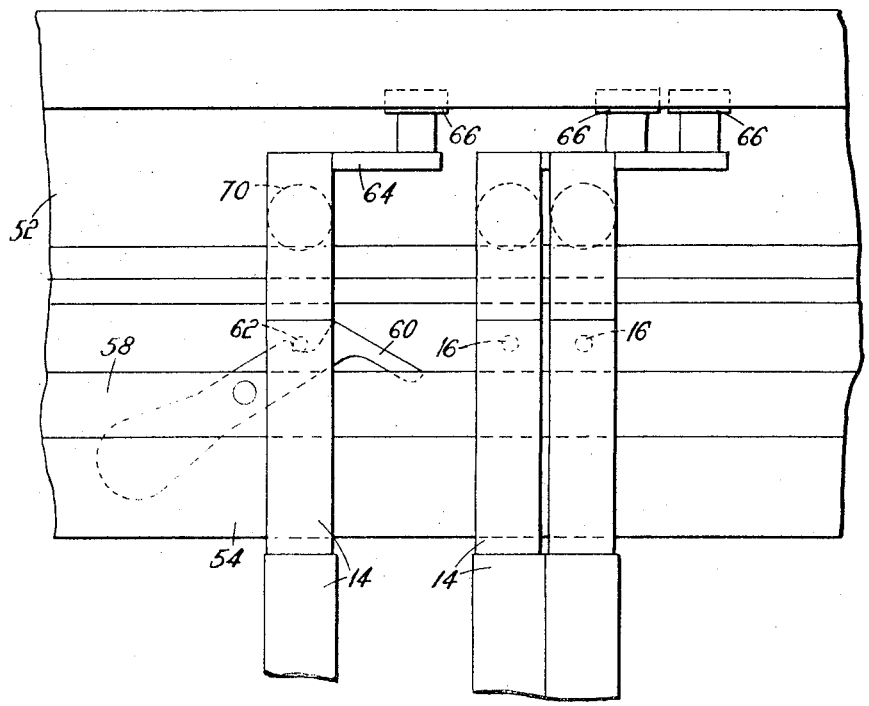
Figure 5:
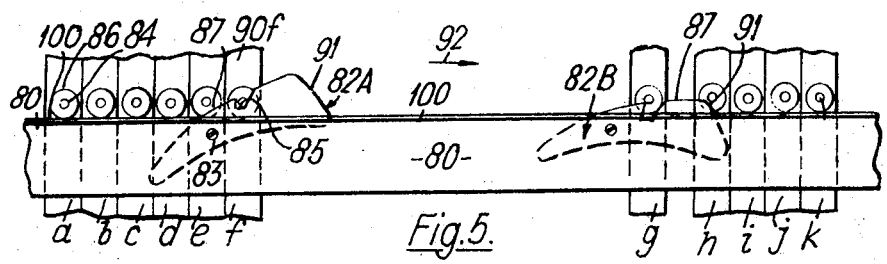
FIGS. 5 through 8 are side elevational views of still another alternative arrangement showing the various stages of the reciprocating action that moves the trays down the filter press.

In FIGS. 3 and 4 the press trays 14 are suspended from a single overhead girder 52 to the bottom flange 52$^a$ of which a bracket 54 is fastened by screws 56. The bracket holds twin slide bars each consisting of two side plates 58 which are spaced apart and secured together by distance pieces. Between each pair of side plates there are mounted pivoted catches 60 (equivalent to those 28 FIG. 1) which engage with the pins 62 on the press trays 14, as before-mentioned. The press trays 14 have extension brackets 64 at the top of which extend inwards and carry rollers 66 which run against rails 68 attached to the girder 52 to steady the trays and prevent them from slowing as they are moved along the girder, the trays being carried by rollers 70 running along the bottom flanges 52$a$ of the girder. The reciprocation of the slide bars in FIGS. 3 and 4 may be effected by arrangements similar to either of those illustrated in FIGS. 1 and 2 or in FIGS. 3 and 4.

Figure 6:
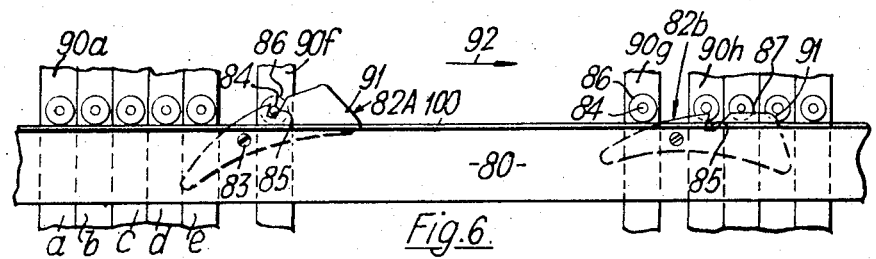
Figure 7:
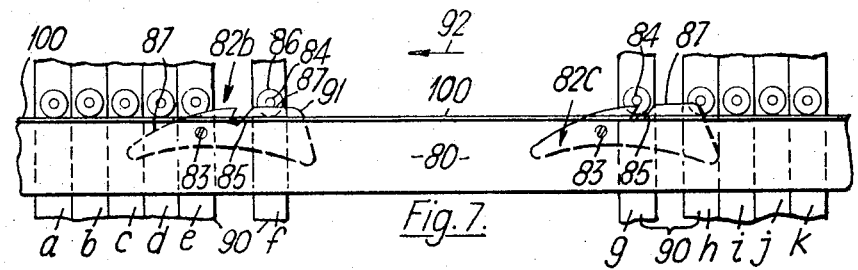
Figure 8:
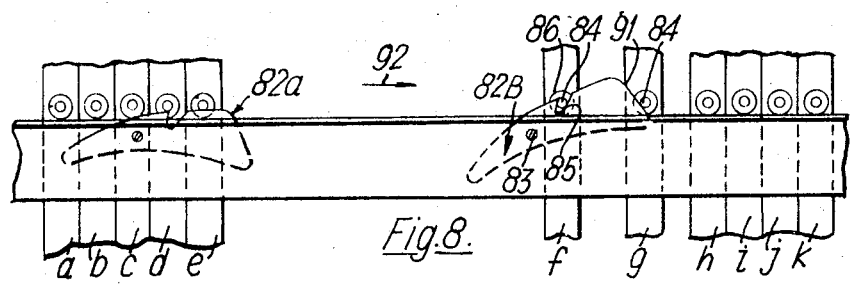

Turning now to FIGS. 5–8, two horizontal reciprocating bars 80 (one only illustrated) similar to the bars 20 of FIG. 1, slidably mounted in guides (not shown) coact to move to and fro a plurality of catches or pawls generally designated as 82 pivotably mounted through pivot pin 83 to slide bar 80. Each catch 82 has a recess 85 so shaped to engage under axial pins 84 extending out from rollers 86 connected to the filter press trays 90. The top surface 87 of catch 82 slides under the pins 84 of the stacked filter press trays 90 as the bar 80 moves backward (to the left as illustrated), carrying the catch 82 with it. The plurality of adjacent pins 84 above surface 87 of the catch 82A prevent the recess 85 from engaging a tray 90 until the catch is reciprocated forward as indicated by arrow 92 of FIG. 5, thus allowing the recess 85 to engage pin 84 only on the leading filter press tray 90$f$. It can be seen then, that the design of the catch or pawl 82 only allows that one tray at a time be transported by the reciprocating bar 80 down a track 100 by the rollers 86. FIG. 6 shows catch 82A transporting tray 90$f$ down track 100. Catch 82B has just released tray 90$g$ just short of abutting tray 90$h$. The leading edge 91 of top surface 87 of catch 82B is forced under pin 84 of tray 90$h$, thus releasing recess 85 from engagement with pin 84 of tray 90$g$. At this point reciprocating bar 80 moves backward as indicated by arrow 92, FIG. 7 carrying catch 82B towards tray 90$f$. Catch 82B engages tray 90$f$ as the bar again moves forward thereby moving tray 90$f$ towards tray 90$g$ (arrow 92 of FIG. 8). As the leading edge 91 of catch 82B contacts pin 84 of tray 90$g$, the force of the reciprocating bar moves tray 90$g$ tight against tray 90$h$. When tray 90$g$ contacts tray 90$h$, the angled surface of leading edge 91 causes the catch 82B to rotate on pin 83, thereby disengaging recess 85 from pin 84 of tray 90$f$. Subsequent reciprocating action moves each tray 90$a$ through 90$k$ individually down the filter press, thus allowing each filter cake associated with each tray to drop from the tray without interference caused by cake sediment build-up and the like, as previously described.

Referring to FIG. 9 a reciprocating bar is shown in part at 120. A press tray in process of being opened out is indicated at 114. The tray has been moved from the left as illustrated to allow a filter cake to drop from between it and the next (still unmoved) tray of the pack and the press tray 114 is shown near to the stack of previously opened trays indicated at 114$^e$. Catches 128 are pivotally mounted at suitable intervals on pivots 128$^a$ on the bar 120 and the nose 128$^b$ of the operative catch acts as the catch moves to the right to push the trays 114$^a$ close up to each other. The bar 120 reaches the limit of its movement to the right and presently returns to the left. A pin 116$^a$ of a roller 116 or skid on the press tray which has hitherto been operatively engaged in a recess 128$^c$ in the upper perimeter of the catch now rides up the sloping face and out of the recess 128$^c$ on to a flat 128$^d$ on the catch, thus depressing the catch against the action of a tension spring 129 connected between the bar 120 and the catch 128. As soon as the catch moves clear of the pin 116$^a$ it rises under the spring action to an extent limited by an adjustable buffer 131 on the bar. The catch presently rides under the roller pin of the next tray awaiting opening and the spring action causes the catch to rise as soon as its recess 128ᶜ is in register under the pin. The pin is thus engaged by the operative face of the recess (the left hand side of the recess as illustrated) and is opened out, as previously described, when the bar 120 again moves to the right. It will be realised that the catches will be moving under an unopened line of trays inoperatively until the opening of the trays progressively brings further catches along the line into operation, and the flat 128ᵈ on each catch serves to ensure that the catches do not move up and down while riding under the line of roller pins on unopened trays. The catches are desirably of hollow fabricated construction to reduce weight.

During the tray-opening cycle, the reciprocatory movement of the bar 20 will cause the first catch 28 to move the first tray 14 of the pack to the right, as viewed in FIG. 1, until the bar reaches the limit of its reciprocatory movement in that direction. The first try cannot be moved past a position occupied by the end member 10 although the reciprocatory stroke of the bar 20 may continue past this position. As regards this first tray of the pack a cam member 29 mounted on the end member 10 may serve the same purpose as the abutments associated with the trays, i.e., engage a surface of and deflect the first catch member from the first tray when the first tray is moved as far as possible to the right and as the stroke continues past this position to the right. Thus the first tray will be close up against the member 10, and the first catch will remain depressed until the stroke of the bar 20 toward the left moves the catch from under the profile. The catch then rises and is carried back towards the pack of trays. It may alternatively be the case, however, that the reciprocatory movement of the bar 20 to the right, as viewed in FIG. 1, will cease with the first tray still a short distance clear of the end member 10, and to provide for such a contingency the improved form of catch illustrated in FIG. 9 is adopted. In this form, as soon as the bar 20 begins to return, the pin 116ᵃ will ride out of the recess 128ᶜ on to the flat 128ᵈ, so that the return stroke of the bar 120 will leave the first tray behind in its opened position.

I claim:

1. A filter press having end frames, girder means extending horizontally along the press between the end frames, a pack of filter press trays, rollers associated with each tray, the rollers running on the girder means to carry the trays on the girder means in a movable manner, bar means extending horizontally along the press, powered apparatus for subjecting the bar means to reciprocatory movements, a plurality of catch members mounted in a pivotal manner at intervals along the bar means, abutments associated with the trays, said catch members being adapted normally to lift pivotally into abutment-engaging positions but being capable of being deflected downwardly clear of said abutments and of moving thereunder, said catches being set at predetermined spacing which is less than the length of the stroke of the reciprocatory movement of the bar means, said reciprocatory movements serving first to carry the catch members in the direction of said pack of filter trays awaiting movement and on reversal of the reciprocatory movement to bring back the catch members whereby one of them on moving from under the abutments lifts and engages with the abutments of the first tray of the pack and in the continuing reverse reciprocatory movement moves it away from the pack, and means for disengaging each catch member from the abutment of the tray which it moves away from the pack after movement of that tray away from the pack has been completed.

2. A filter press as claimed in claim 1 having two girders, one at each side of the press, two reciprocating bars, and guides on the girders in which the respective bars are slidably mounted, each bar having a plurality of carriages attached to it, tracks carried by the respective girders, the carriages running on the tracks, and the catch members being mounted on the carriages.

3. A filter press as claimed in claim 1 having a single overhead girder, two parallel reciprocatory bars supported from the girder, catch members pivotally mounted on the respective bars, and abutments on the press trays positioned for engagement with the catch members.

4. A filter press as claimed in claim 1 having a mechanical linkage, said linkage being connected with the bar means for effecting reciprocatory movement thereof.

5. A filter press as claimed in claim 1 having fluid pressure means, said fluid pressure means being connected with the bar means for effecting reciprocatory movement thereof.

6. A filter press as claimed in claim 1 wherein said disengaging means includes a cam means carried by one of said end frames, and a surface of said catch arranged to engage said cam means during the reverse movement of said bar means.

7. A filter press as claimed in claim 1 including recesses in said catches capable of engaging with said abutments, and wherein said disengaging means include sloping faces of said recesses upon which said abutments can ride out of said recesses upon reverse movement of said bar means.

8. A filter press having end frames, girder means extending horizontally along the press between the end frames, a pack of filter press trays, each tray having rollers running on the girder means, bar means extending horizontally along the press parallel with the girder means, powered operating means for subjecting the bar means to lengthwise reciprocatory movements, a plurality of pivots fixed to the bar means at spaced intervals therealong, a plurality of catch devices each mounted upon one of the pivots, a plurality of springs one connected to each catch device and to the bar means, said springs tending to lift said catch devices, abutments associated with each tray, said catch devices having recesses therein capable of engaging with the abutments when the catch devices are lifted by the spring action, said reciprocatory movements of the bar means serving first to move the catch members towards said pack of filter trays awaiting movement, whereby said catch members are deflected downwardly against the spring action, and on reversal of the reciprocatory movement to bring back the catch devices so that one of them, emerging from under the abutments on the pack of trays, is raised by its spring action and made to lift operatively by its recess into engagement with the first tray of the pack and move said first tray away from the pack, and means for disengaging each catch member from the abutment of the tray which it moves away from the pack after movement of that tray away from the pack has been completed.

9. A filter press as claimed in claim 8 in which each of said catch devices has an upper perimeter in which said recesses are formed, and said tray rollers having extending pins constituting the abutments with which said recesses engage, when lifted by the action of the springs, and buffers on said bar means one associated with each of said catch devices and serving to limit the amount of lifting movement imparted to the catch devices by the springs.

* * * * *